United States Patent [19]
Kloenne et al.

[11] 3,961,327
[45] June 1, 1976

[54] AUDIBLE ALARM FOR A SYNCHRONOUS MOTOR

[75] Inventors: Ernest F. Kloenne; Kanti D. Patel, both of Indianapolis, Ind.

[73] Assignee: P. R. Mallory & Co., Inc., Indianapolis, Ind.

[22] Filed: July 22, 1974

[21] Appl. No.: 490,805

[52] U.S. Cl. .............................. 340/402; 340/392; 335/261; 310/15
[51] Int. Cl.² .................. G01K 1/08; H01F 7/08
[58] Field of Search ........... 340/384, 392, 400, 401, 340/402; 58/16, 21.14; 310/164, 15, DIG. 1; 74/3.54; 200/35 R, 38 R; 335/252, 261

[56] References Cited
UNITED STATES PATENTS

| | | |
|---|---|---|
| 3,223,861 | 12/1965 | Steiner ........................... 335/252 X |
| 3,262,110 | 7/1966 | Gardes ............................... 340/392 |
| 3,350,589 | 10/1967 | Suarnias ..................... 58/21.14 UX |
| 3,601,973 | 8/1971 | Bassett et al. ..................... 58/21.14 |
| 3,694,591 | 9/1972 | Bassett et al. ................ 200/35 R X |

Primary Examiner—John W. Caldwell
Assistant Examiner—William M. Wannisky
Attorney, Agent, or Firm—Hoffmann, Meyer & Hanson

[57] ABSTRACT

A buzzer arm is attached to a synchronous motor to provide an audible alarm in response to energization of a winding of the motor and the relative position of the buzzer arm to a buzzer anvil extending from the motor.

8 Claims, 4 Drawing Figures

AUDIBLE ALARM FOR A SYNCHRONOUS MOTOR

Generally speaking, the present invention relates to an audible alarm and more specifically to a buzzer that cooperates with a synchronous motor, wherein a buzzer anvil extends from the motor and a bight-shaped metal-containing buzzer arm is carried by the motor next the buzzer anvil in a position so as to vibrate against the anvil upon energization of the winding of the motor.

Audible alarms in the form of buzzers are commonly used in conjunction with synchronous motors. In these combinations, the AC winding of a synchronous motor serves a secondary function of providing an alternating electromagnet for a buzzer arm. Buzzers of this type come in a variety of sizes and shapes. Many are pivotally mounted near a synchronous motor so as to engage a portion of the motor acting as an electromagnet. Many have accompanying pivot posts, torsion springs, retainer rings, and adjustment set screws. One example of this kind of buzzer can be found in U.S. Pat. No. 3,694,591, A Motor Driven Timer With Cam Operated Buzzer Construction, by R. M. Bassett and J. F. Gluth.

The present invention provides a buzzer for a synchronous motor that is easier to assemble and less costly than many pivotally mounted buzzers. This buzzer does not require as precise an adjustment setting for the gap between the buzzer arm and the buzzer anvil as is needed in a pivotally mounted buzzer. And, the present invention produces a louder, and therefore more desirable, buzz than any of the pivotally mounted buzzers.

Accordingly, it is a feature of the present invention to provide an audible alarm that cooperates with a synchronous motor to produce an audible sound. Another feature of the present invention is to provide an audible alarm that utilizes an AC winding of a synchronous motor to provide an alternating electromagnetic field in which a buzzer arm vibrates. Another feature of the present invention is to provide a generally bight-shaped buzzer arm carried by a synchronous motor, wherein a portion of the buzzer arm is located near and vibrates against a buzzer anvil extending from the motor. Yet another feature of the present invention is to provide an audible alarm that includes a buzzer anvil as an integral part of an inner field stator pole member of the motor. Still another feature of the present invention is to provide an audible alarm that is riveted to a synchronous motor. Yet another feature of the present invention is to provide an audible alarm that is welded to a synchronous motor. Still another feature of the present invention is to provide an audible alarm that includes a follower projection as an integral part of a buzzer arm for engaging a timing cam. Yet another feature of the present invention is to provide an audible alarm that includes a cylindrical pin fixedly carried by a buzzer arm for engaging a timing cam. These and other features will become more apparent from the specification taken in conjunction with the accompanying drawings wherein:

Figure 1:
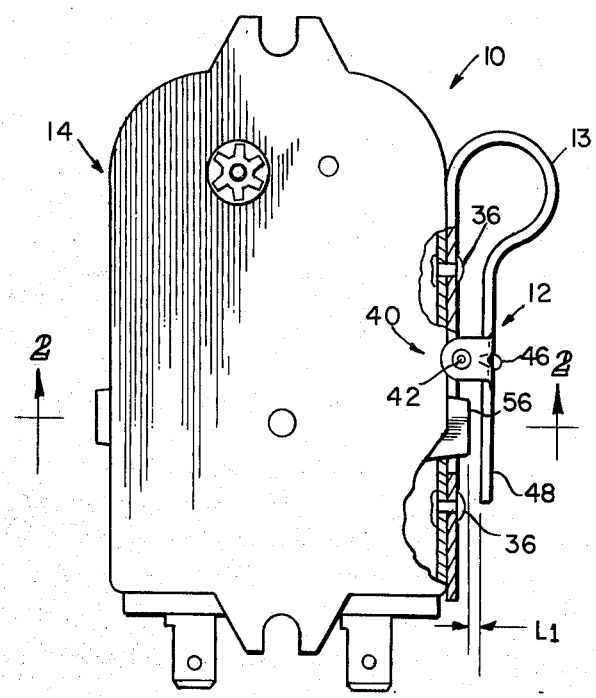
FIG. 1 is a front view of a synchronous motor with a buzzer attached to it by rivets.

Referring now to FIG. 1, a synchronous motor 10 includes a buzzer assembly shown generally at 12. It should be understood that the invention is by no means limited to the motor illustrated in the figures. The buzzer assembly 12 may be fitted to many different shapes and styles of synchronous motors with only minor adaptations in mounting.

The motor illustrated in FIGS. 1, 2, 3, and 4 includes a housing 14, a permanent magnet rotor 16, a winding of wire 18, and a set of stator poles 20 which includes an inner field stator pole member 22 and a U-field stator pole member 24.

Figure 2:
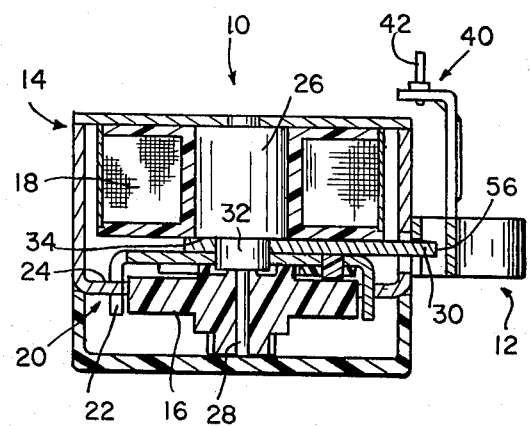
FIG. 2 is a cross section of the motor and buzzer illustrated in FIG. 1 taken along a line 2 — 2.

Referring now to FIG. 2, motor 10 includes an inner core 26 which carries a rotor shaft 28 about which rotor 16 rotates. A buzzer anvil 30 is secured about a stepped portion 32 of core 26 between a shoulder 34 and inner field stator pole member 22. Buzzer anvil 30 can be made of a material, such as iron, capable of providing a path of magnetic flux from the center of the motor to the buzzer assembly 12.

Figure 3:
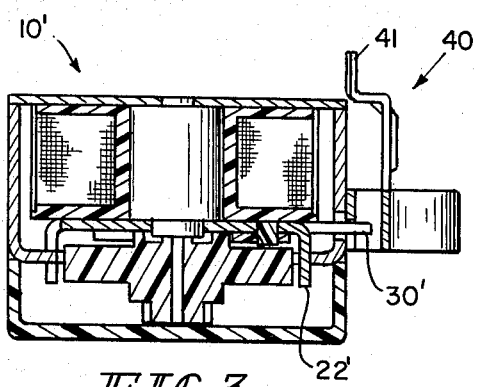
FIG. 3 is the cross section as shown in FIG. 2 but with a buzzer anvil formed as part of an inner field stator pole member.

In another embodiment of motor 10, shown as 10' in FIG. 3, the same buzzer assembly is used, but in this example a buzzer anvil 30' is formed as part of an inner field stator pole member 22'. The operation of buzzer assembly 12 is the same for both embodiments of motors 10 and 10'.

Figure 4:
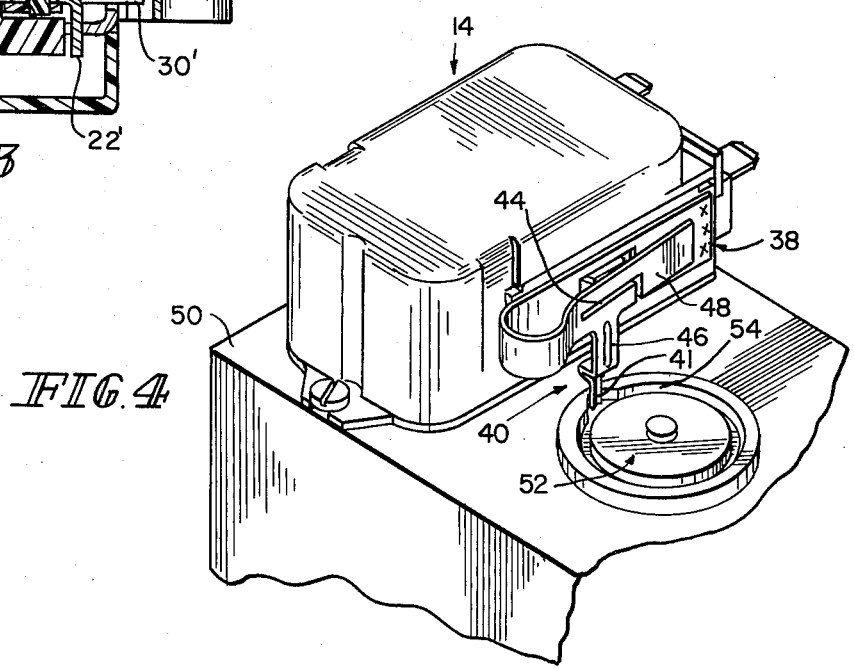
FIG. 4 is a pictorial view of the motor and buzzer of FIG. 1 in conjunction with a timing cam.

Buzzer assembly 12 is illustrated in FIG. 1 as a bight-shaped buzzer arm 13 riveted to the housing of motor 10 with rivets 36. Many different attachment means can be used to connect buzzer arm 13 with a motor without departing from the spirit and gist of the present invention. Another means of attachment is shown in FIG. 4 as welding 38.

Buzzer assembly 12 includes a follower projection 40. One form of projection 40 is cylindrical pin 42 staked to the buzzer as shown in FIG. 1. FIG. 4 shows a variation of follower projection 40 as a formed projection 41 integral with the buzzer.

Buzzer arm 13 further includes a slot 44, a strengthening rib 46, and a contacting distil end 48. Slot 44 allows end 48 to vibrate freely without imparting a lot of vibration of the follower projection 40. Rib 46 stiffens buzzer arm 13 in the area where it extends toward follower projection 40.

Buzzer arm 13 may be made of any number of flexible materials such as thermo-plastic. The only material requisite for successful operation of the buzzer is that a magnetically attractable material be carried by buzzer arm 13 near buzzer anvil 30.

FIG. 4 shows motor 10 mounted on a device such as a timer switch 50. A timing cam 52 is carried by timer 50 so that an internal profile groove 54 of cam 52 is engaged by follower projection 40.

In operation, winding 18 of motor 10 is energized by an alternating current power supply (not shown). This results in an alternating magnetic field appearing in the set of stator poles 20. Rotor 16 rotates within the magnetic field in a manner well known and understood by persons skilled in the art. The alternating magnetic field also appears at a distal end 56 of buzzer anvil 30 and intermittently attracts distal end 48 of buzzer arm 13. The impacting of buzzer arm 13 against buzzer anvil 30 results in an audible buzzing sound.

The air gap between the distal end 58 of the buzzer arm 13 and anvil 30 (indicated as L1 in FIG. 1) must be small enough to allow the magnetic field to attract buzzer arm 13 to anvil 30 but not so small as to diminish the sound level of the buzzer. Adjustment of the air gap can be easily accomplished by bending and slightly deforming the buzzer arm 13 near the loop.

The buzzer and motor may be employed in an application where the buzzing is selectively turned on and off. One such example is shown in FIG. 4 where motor 10 is attached to a cam-actuated timer 50. A cam 52 engages follower projection 40 so as to change the air gap L1 between a nonbuzzing condition where the buzzer is pulled away from anvil 30 and a buzzing condition where the buzzer is allowed to vibrate against the anvil.

What is claimed is:

1. In a synchronous motor having a rotor, a winding, and a set of stator poles, an audible alarm, comprising:
   a. a buzzer anvil electromagnetically connected to said stator poles projecting from said synchronous motor; and
   b. a bight-shaped magnetically-attractable buzzer arm carried by said motor juxtaposition to said buzzer anvil and intermittently engaging said buzzer anvil upon energization of said winding, whereby said engagement of said buzzer arm and said buzzer anvil produces a buzzing sound.

2. The audible alarm as recited in claim 1 wherein said set of stator poles include an inner field stator pole member and an U-field stator pole member and said buzzer anvil is an integral part of said inner field stator pole member.

3. The audible alarm as recited in claim 1 wherein said anvil projects out from said synchronous motor in a direction substantially at a right angle to the rotational axis of said rotor.

4. The audible alarm as recited in claim 1 wherein said buzzer arm is mechanically attached to said synchronous motor with rivets.

5. The audible alarm as recited in claim 4 wherein said buzzer arm is attached to said synchronous motor by a weld.

6. The audible alarm as recited in claim 1 wherein said buzzer arm includes a follower projection for engaging a timing cam.

7. The audible alarm as recited in claim 6 wherein said follower projection is formed integrally with said buzzer arm.

8. The audible alarm as recited in claim 6 wherein said follower projection comprises a cylindrical-shaped pin fixedly carried by said buzzer arm.

* * * * *